United States Patent
Persing

(10) Patent No.: US 6,672,545 B1
(45) Date of Patent: Jan. 6, 2004

(54) DEVICE FOR RESISTING MOVEMENT OF A SUSPENDED PIPE

(75) Inventor: Richard Persing, Nappanee, IN (US)

(73) Assignee: Erico International Corporation, Solon, OH (US)

( * ) Notice: Subject to any disclaimer, the term of this patent is extended or adjusted under 35 U.S.C. 154(b) by 112 days.

(21) Appl. No.: 09/707,511

(22) Filed: Nov. 7, 2000

(51) Int. Cl.[7] .................................. E21F 17/02
(52) U.S. Cl. ............................. 248/58; 248/63
(58) Field of Search ................ 248/59, 62, 63; 174/70 A, 44 CC, 135; 24/274 WB, 278, 135 A, 135 R

(56) References Cited

U.S. PATENT DOCUMENTS

| | | | |
|---|---|---|---|
| 428,690 A | 5/1890 | McKelvey | 248/59 |
| 854,209 A | 5/1907 | Goss | 248/205.1 |
| 1,124,648 A | 1/1915 | Penniman | 248/58 |
| 1,394,988 A | 10/1921 | Folberth | 248/226.11 |
| 1,888,265 A | 11/1932 | Guthrie | 411/470 |
| 2,111,357 A | 3/1938 | Cornell, Jr. | 248/58 |
| 2,339,564 A * | 1/1944 | Goldberg et al. | 248/58 |
| 2,391,235 A * | 12/1945 | Hathorn | 24/278 |
| 2,391,840 A * | 12/1945 | Smith | 242/385.1 |
| 2,515,484 A * | 7/1950 | Zaleske | 24/278 |
| 3,131,447 A | 5/1964 | Tinnerman | 248/231.81 |
| 3,218,011 A | 11/1965 | Ammann | 248/62 |
| 3,236,482 A | 2/1966 | Fitzgerald | 248/62 |
| 3,570,794 A | 3/1971 | Kirschner | 248/74 |
| 3,714,744 A | 2/1973 | Koziarz | 52/28 |
| 3,872,947 A | 3/1975 | Cranfield | 182/82 |
| 3,920,208 A | 11/1975 | Dowdy et al. | 248/56 |
| 3,931,919 A | 1/1976 | Gerber et al. | 224/42.1 F |
| 4,330,491 A | 5/1982 | Doshi et al. | 261/111 |
| 4,413,799 A | 11/1983 | Gabriel | 248/59 |
| 4,429,440 A | 2/1984 | Laughlin et al. | 24/486 |
| 4,455,011 A | 6/1984 | Levine | 248/646 |
| 4,461,440 A | 7/1984 | Heath | 248/59 |
| 4,473,205 A | 9/1984 | Rumble | 248/58 |
| 4,487,387 A | 12/1984 | Heath | 248/59 |
| 4,570,885 A | 2/1986 | Heath | 248/72 |
| 4,697,770 A | 10/1987 | Kirschner | 248/62 |
| 4,723,749 A | 2/1988 | Carraro et al. | 248/317 |
| 4,858,860 A | 8/1989 | Richards | 248/62 |
| 5,127,577 A | 7/1992 | Lynch, Jr. et al. | 238/378 |
| 5,141,185 A | 8/1992 | Rumbo et al. | 248/71 |
| 5,148,981 A | 9/1992 | Lynch, Jr. et al. | 238/351 |
| 5,149,040 A | 9/1992 | Heath | 248/300 |
| D338,827 S | 8/1993 | Rumble | D8/380 |
| 5,295,646 A | 3/1994 | Roth | 248/58 |
| 5,344,108 A | 9/1994 | Heath | 248/62 |
| 5,462,246 A | 10/1995 | Schlenker | 248/49 |
| 5,472,162 A | 12/1995 | Mason | 248/121 |
| 5,533,696 A | 7/1996 | Laughlin et al. | 248/74.2 |

(List continued on next page.)

FOREIGN PATENT DOCUMENTS

| | | |
|---|---|---|
| DE | 834304 | 7/1949 |
| SE | 208750 | 1/1964 |

OTHER PUBLICATIONS

Publication, "Tolco Incorporated", Feb. 1992, 1 page.
Publication, Erico, FPC/Fire Proection Contractor, page 33.

*Primary Examiner*—Leslie A. Braun
*Assistant Examiner*—Kofi Schulterbrandt
(74) *Attorney, Agent, or Firm*—John W. Renner; Renner, Otto, Boisselle & Sklar

(57) ABSTRACT

A device for resisting movement of a pipe suspended by a pipe hanger includes a base and a pair of arms extending from the base. A recess is formed in each of the arms for receiving a portion of a pipe hanger. A projection extends from each arm. The device fits between a suspended pipe and the hanger. Contact between the arms and projections of the device on the one hand and a portion of the pipe hanger on the other hand resists movement of the pipe. Contact between the arms and a portion of the pipe hanger resists movement of the device with respect to the pipe hanger.

48 Claims, 2 Drawing Sheets

U.S. PATENT DOCUMENTS

| | | | |
|---|---|---|---|
| 5,667,177 A | 9/1997 | van Leeuwen et al. | 248/74.2 |
| 5,667,181 A | 9/1997 | van Leeuwen et al. | 248/343 |
| 5,702,077 A | 12/1997 | Heath | 248/59 |
| 5,740,994 A | 4/1998 | Laughlin | 248/68.1 |
| 5,897,088 A | 4/1999 | Kirschner | 248/300 |
| 5,947,424 A | 9/1999 | Heath | 248/58 |
| 5,967,480 A | 10/1999 | Kirschner | 248/300 |
| 6,040,525 A | 3/2000 | Chauquet et al. | 174/40 |

\* cited by examiner

DEVICE FOR RESISTING MOVEMENT OF A SUSPENDED PIPE

BACKGROUND AND SUMMARY OF THE INVENTION

The present invention relates to a device for resisting movement of a suspended pipe.

Pipe hangers of various kinds are well known in the art. Examples of such hangers are shown in U.S. Pat. No. 4,413,799 to Gabriel and U.S. Pat. No. 5,344,108 to Heath. Such hangers typically include a strap-like member bent into a loop or stirrup-like configuration with the ends of the strap overlapping. The pipe rests within the loop. A threaded rod or similar device extends through the overlapping ends. A nut or other fastener or retaining device may be attached to the rod to secure the rod to the loop. The other end of the rod is secured to the surface from which the pipe is to be suspended. With this arrangement, a gap typically exists between the overlapping ends of the strap and the pipe. One end of the rod and the nut are located in this gap such that there is space between the end of the rod and the pipe.

Suspended pipes can move for several reasons. For example, a fluid carrying pipe may begin to move when pressurized fluid is released into the pipe. This is a phenomenon known as pipe surge. The pipes can also move if they are inadvertently stuck. Suspended pipes may also move during earthquakes. If the movement is drastic enough, it can damage the pipe by causing it to distort or crack. Severe movement can cause the pipe to strike the end of the rod protruding through the loop and break or otherwise damage the pipe.

One embodiment of the present invention is a device for resisting movement of a pipe relative to a pipe hanger having a loop for receiving the pipe and a nut located at least partially within the loop. The device includes a base having first and second arms extending upward from the base. Each of the arms has a first end connected to the base and a second end. A projection extends from the first arm for contacting the portion of the nut within the loop to resist movement of the pipe relative to the loop in at least one direction. The projection may extend from one arm toward the other. The arms may also resist movement of the pipe and may include a recess for receiving a portion of the loop. The projection may be centered with respect to the recess. In one embodiment of the invention, the first and second arms are movable relative to the base. The arms may be biased away from each other.

According to another embodiment of the invention device for resisting movement of a pipe relative to a pipe hanger having a loop for receiving the pipe includes a base and first and second arms extending upward from the base. Each of the arms has a first end connected to the base and a second end. There is a space between the second ends of the arms. The first arm contacts a portion of the loop to resist movement of the pipe relative to the loop in at least one direction. The device may also include a recess in at least one of the arms for receiving a portion of the loop. The device can also include one or more projections for resisting movement of the device relative to the loop. The projections may extend from the arms. The arms can be flexible, movable relative to the base and/or biased away from each other.

In another embodiment of the invention, a device for resisting movement of a pipe in a pipe hanger having a loop in which the pipe rests and a nut extending into the loop includes a base, a first and second arms extending from the base and contacting an interior surface of the loop, recesses in the first and second arms for receiving portions of the loop and projections extending from each of the arms and contacting a portion of the nut within the loop. The projections may be centered with respect to the recesses. The arms may also contact the exterior surface of the loop.

These and other features of the present invention will be apparent from the following detailed description of the preferred embodiments and the accompanying drawings.

DETAILED DESCRIPTION OF THE PREFERRED EMBODIMENTS

Figure 1:
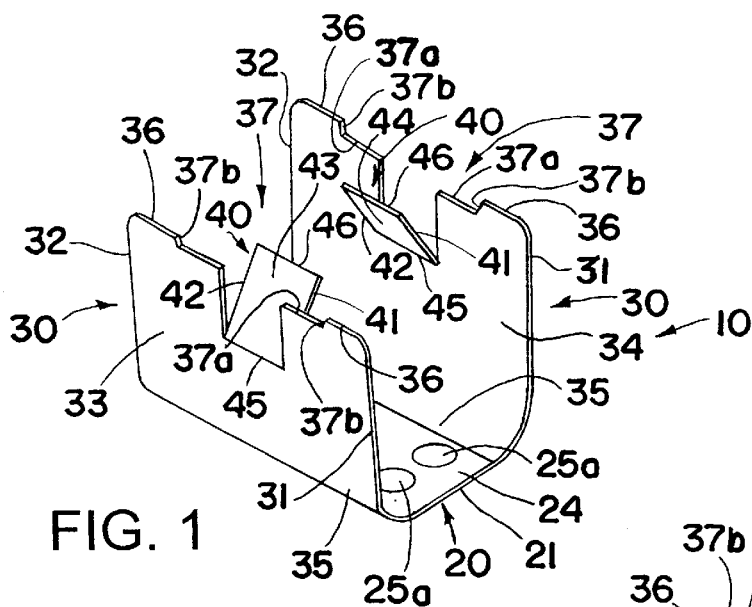
FIG. 1 is a perspective view of a device for resisting movement of a suspended pipe according to one embodiment of the present invention.

FIG. 1 shows a perspective view of a pipe restrainer 10 according to one embodiment of the present invention. As described below, restrainer 10 is a device for resisting movement of a pipe in a pipe hanger. Restrainer 10 generally includes a base 20, a pair of arms 30, and a pair of projections 40. Base 20, in the embodiment shown, is a generally rectangular member having a first end 21, a second end 22, a first surface 23 and a second surface 24. A pair of projections 25 extend below first surface 23 of base 20. In the embodiment shown, projections 25 are formed in base 20 by stamping so as to form a recessed area 25a in second surface 24. Other methods may also be used to form projections 25. For example, projections 25 could be formed as separate members and welded or otherwise attached to base 20. Note also that although projections 25 are shown adjacent first end 21 and second end 22, they could be moved to other locations on base 20. Additionally, it is not necessary that four projections 25 be utilized. More or less can be used as desired.

Each arm 30 includes a first edge 31, a second edge 32, a first surface 33, and a second surface 34. Each arm 30 is attached to base 20 along a lower end 35. Each arm 30 further includes an upper end 36 having a recess 37. Portions 37a and 37b of arm 30 are adjacent recesses 37. In the embodiment shown, portions 37a are disposed at a right angle to portions 37b. In the embodiment shown, arms 30 are integrally formed with base 20 by bending or stamping a generally rectangular piece of metal into the substantially U-shaped member illustrated in FIG. 1. In this manner, two arms 30 extend from base 20 and oppose each other as shown. Other methods of producing restrainer 10 may also be used. For example, arms 30 could be formed separately from base 20 and welded or otherwise attached to base 20.

Each projection 40 includes a first end 41, a second end 42, a first surface 43, and a second surface 44. Each projection 40 is attached along a lower edge 45 to an arm 30 and is centered with respect to recesses 37. Each projection 40 further includes an upper edge 46. Projections 40, in the embodiment shown, extend from a point below recesses 37 inwardly toward one another from arms 30. Projections 40, in the embodiment shown, are formed by stamping them from arms 30. However, other methods of producing projections 40 may also be used. For example, projections 40 may be separately formed and welded or otherwise attached to arms 30.

Figure 2:
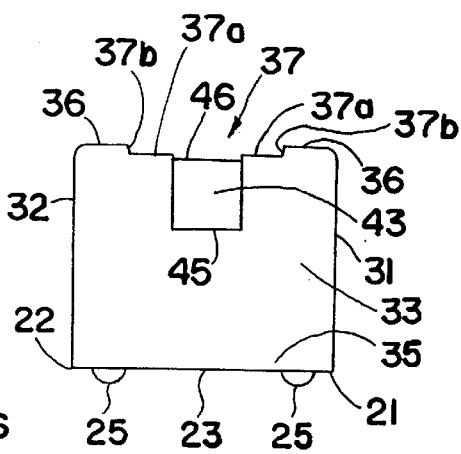
FIG. 2 is a side elevational view of the device shown in FIG. 1.

In one embodiment the invention, restrainer 10 is stamped from a single piece of steel such that arms 30 are resilient. Arms 30 can be formed such that they are angled or biased away from one another. In this manner, arms 30 can be compressed toward one another as described below, and, when the compressive force is released, will spring back toward the position shown in FIGS. 1–3.

Figure 3:
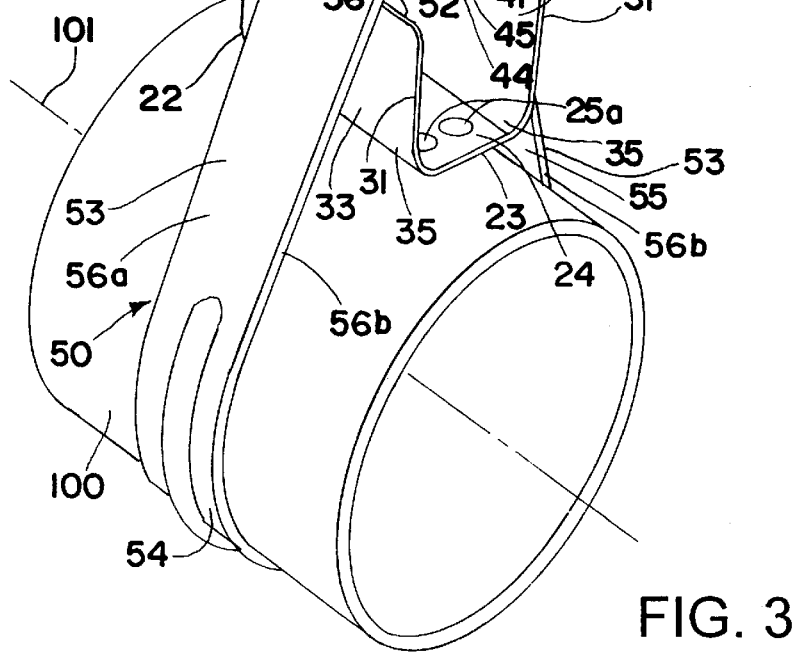
FIG. 3 is a perspective view of the device shown in FIG. 1 installed on a pipe.
Figure 4:
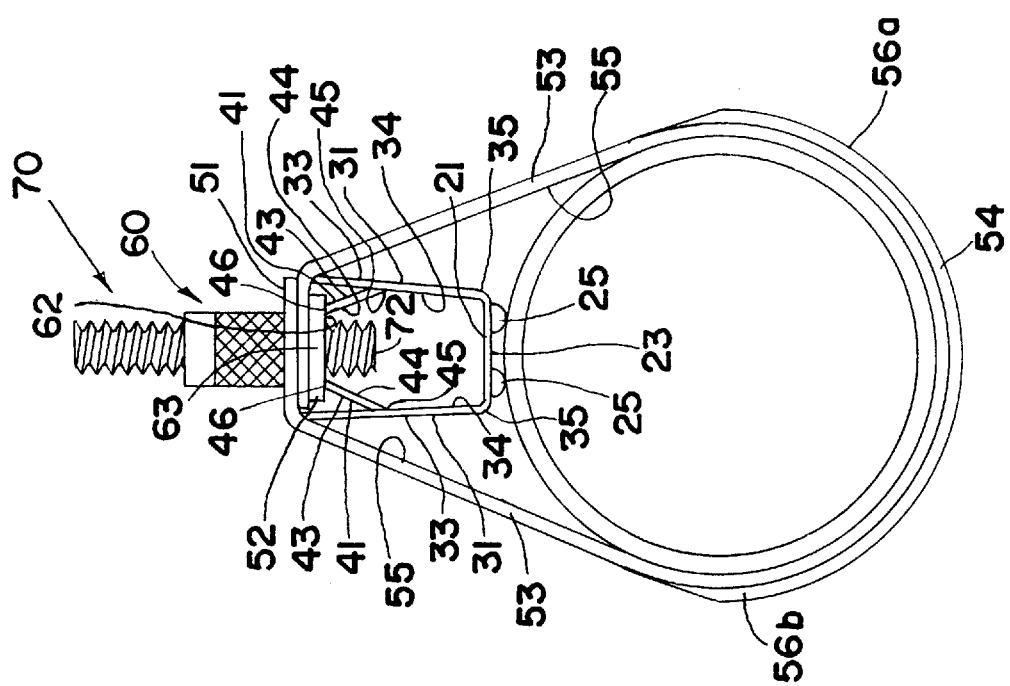
FIG. 4 is an end view of FIG. 3
Figure 5:
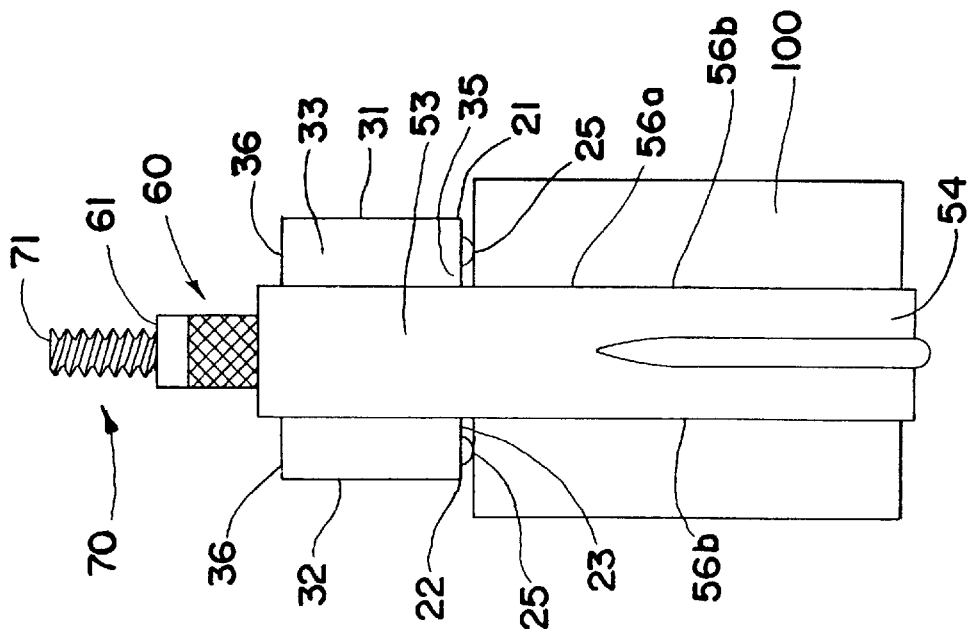
FIG. 5 is a side elevational view of FIG. 3.

FIGS. 3–5 show pipe restrainer 10 of FIG. 1 in use with a pipe and pipe hanger. The hanger generally includes a strap bent in the shape of a loop 50. Loop 50 includes overlapping ends 51 and 52, opposed sides 53 joined by a base 54, interior surface 55 and exterior surface 56. Note that exterior surface 56 includes a portion 56a directly opposite interior surface 55 and two opposed portions 56b disposed between interior surface 55 and exterior surface portion 56a. A nut 60 includes a first end 61 and a second end 62. A flange 63 is formed adjacent to second end 62. At least a portion of the interior of nut 60 is threaded (not shown). The pipe hanger further includes a hanging rod 70 having a first end 71 and a second end 72. In the embodiment shown, rod 70 is threaded.

In use, the first end 61 of nut 60 is inserted upwardly through openings (not shown) in overlapping ends 51 and 52 of loop 50 such that flange 63 abuts one of the overlapping ends as shown. Rod 70 is secured to nut 60 by inserting second end 72 into nut 60 and engaging the threads with the threads on the interior of nut 60. The opposite end 71 of rod 70 is secured, either directly or through a bracket or other device, to the surface from which pipe 100 is to be suspended.

Once pipe 100 is positioned within loop 50 so as to rest in base 54 as shown, pipe restrainer 10 is inserted into the space between pipe 100 and sides 53 as shown in FIGS. 3–5. To position restrainer 10, arms 30 are compressed toward one another and restrainer 10 is inserted between sides 53 of loop 50 until recesses 37 are positioned as shown. Arms 30 are then released such that they spring back into contact with sides 53 of loop 50. In this position, at least a portion of each arm 30 is adjacent to or in contact with interior surface 55 of sides 53. Portions 37b of arms 30 are adjacent to or in contact with portions 56b of exterior surface 56 of loop 50. Portions 37a of arms 30 are adjacent to or in contact with the interior surface 55 of loop 50. In this position, second end 72 of rod 70 extends between projections 40. Upper edges 46 of projections 40 contact or are adjacent to flange 63. One or more projections 25 contact or are adjacent the outer surface of pipe 100. Note, however, that it is not necessary to include projections 25 on restrainer 10. These projections could be elimnated and restrainer 10 positioned such that surface 23 of base 20 contacts the outer surface of pipe 100.

Although the present invention has been shown and described in detail, the same is for purposes of example only and is not to be taken as a limitation on the invention. Numerous alternatives to this invention will be apparent to those skilled in the art. Accordingly, the scope of the present invention is to be limited only by the following claims.

What is claimed is:

1. A device for resisting movement of a pipe relative to a pipe hanger having a loop for receiving the pipe and a nut located at least partially within the loop, the device including:

a base;

first and second arms extending upward from the base, each of the arms having a first end connected to the base and a second end;

an open space between the second end of the first arm and the second end of the second arm; and a projection extending upwardly at an angle from the first arm toward the second arm and having a free end spaced away from the second arm for contacting the portion of the nut within the loop to resist movement of the pipe relative to the loop in at least one direction.

2. The device according to claim 1, wherein the protection resists vertical movement of the pipe relative to the loop.

3. A device for resisting movement of a pipe relative to a pipe hanger having a loop for receiving the pipe and a nut located at least partially within the loop, the device including:

a base;

first and second arms extending upward from the base, each of the arms having a first end connected to the base and a second end;

an open space between the second end of the first arm and the second end of the second arm;

a projection extending from the first arm for contacting the portion of the nut within the loop to resist movement of the pipe relative to the loop in at least one direction, and wherein at least one of the arms includes a recess for receiving a portion of the loop.

4. The device according to claim 3, wherein the projection extends from a point below the recess.

5. The device according to claim 1, further including a second projection for contacting the nut to resist movement of the pipe relative to the loop in at least one direction, the second projection extending upwardly at an angle from the second arm toward the first arm.

6. The device according to claim 5, wherein the first and second projections extend toward each other.

7. The device according to claim 1, wherein the first and second arms are flexible.

8. The device according to claim 1, wherein the first and second arms are movable relative to the base.

9. The device according to claim 5, further including a third projection extending from the base.

10. The device according to claim 9, wherein the third projection extends below the base.

11. The device according to claim 1, wherein the first and second arms are biased away from each other.

12. The device according to claim 1, wherein the projection extends from a point below the portion of the nut located within the loop.

13. The device according to claim 1, wherein the projection resists vertical movement of the device relative to the loop.

14. The device according to claim 3, wherein the projection is centered with respect to the recess.

15. The device according to claim 1, wherein at least one of the arms resists movement of the pipe in at least one direction.

16. The device according to claim 1, wherein at least one of the arms resists vertical movement of the pipe relative to the loop.

17. The device according to claim 1, wherein at least one of the arms resists movement of the device in a direction transverse to the longitudinal axis of the pipe.

18. The device according to claim 1, wherein at least one of the arms resists movement of the device in at least one direction.

19. The device according to claim 1, wherein at least one of the arms resists vertical movement of the device relative to the loop.

20. The device according to claim 1, wherein at least one of the arms resists movement of the device in a direction parallel to the longitudinal axis of the pipe.

21. The device according to claim 1, wherein the projection extends toward the second arm.

22. A device for resisting movement of a pipe relative to a pipe hanger having a loop for receiving the pipe, the device including:
- a base;
- first and second arms extending upward from the base, each of the arms having a first end connected to the base and a second end, the first arm contacting a portion of the loop to resist movement of the pipe relative to the loop in at least one direction;
- an open space between the second end of the first arm and the second end of the second arm, and further including a recess in at least one of the arms for receiving a portion of the loop.

23. The device according the 22, wherein the first arm contacts the interior surface of the loop.

24. The device according to claim 22, wherein the first arm resists vertical movement of the pipe relative to the loop.

25. The device according to claim 22, wherein the first arm resists vertical movement of the device relative to the loop.

26. The device according to claim 22, wherein the first arm resists movement of the device relative to the loop in at least one direction.

27. The device according to claim 22, wherein the first arm resists movement of the device in a direction parallel to the longitudinal axis of the pipe.

28. The device according to claim 22, wherein the first arm resists movement of the device in a direction transverse to the longitudinal axis of the pipe.

29. A device for resisting movement of a pipe relative to a pipe hanger having a loop for receiving the pipe, the device including:
- a base;
- first and second arms extending upward from the base, each of the arms having a first end connected to the base and a second end, the first arm contacting a portion of the loop to resist movement of the pipe relative to the loop in at least one direction;
- an open space between the second end of the first arm and the second end of the second arm, and wherein the first arm contacts the exterior surface of the loop.

30. The device according to claim 22, further including a first projection for resisting vertical movement of the device relative to the loop.

31. The device according to claim 30, wherein the first projection extends from one of he arms.

32. The device according to claim 31, wherein the first projection extends toward the other arm.

33. The device according to claim 22, further including a first projection for resisting vertical movement of the pipe relative to the loop.

34. The device according to claim 22, further including a projection for resisting movement of the device relative to the loop in at least one direction.

35. The device according to claim 22, further including a projection for resisting movement of the pipe relative to the loop in at least one direction.

36. The device according to clam 33, wherein the first projection extends from one of the arms.

37. The device according to claim 36, wherein the first projection extends toward the other arm.

38. The device according to claim 22, wherein the first and second arms are flexible.

39. The device according to claim 22, wherein the first and second arms are movable relative to the base.

40. The device according to claims 22, wherein the first and second arms are biased away from each other.

41. A device for resisting movement of a pipe in a pipe hanger having a loop in which the pipe rests and a nut extending into the loop, the device including:
- a base;
- a first arm extending from the base and contacting an interior surface of the loop;
- a second arm extending from the base and contacting an interior surface of the loop;
- a recess in the first arm for receiving a portion of the loop;
- a recess in the second arm for receiving a portion of the loop;
- a first projection extending from the first arm and contacting a portion of the nut within the loop; and
- a second projection extending from the second arm and contacting a portion of the nut within the loop.

42. The device according to claim 41, wherein the first and second arms contact the exterior surface of the loop.

43. The device according to claim 41, wherein the first projection is centered with respect to at least one of the recesses.

44. A method of securing a pipe in a pipe hanger comprising the steps of forming a strap loop and suspending a pipe in the bottom of the loop, and suspending the upper portion of the loop from an overhead structure, forming a U-shape restrainer having upwardly extending spring legs, compressing the legs toward each other and inserting the restrainer into the upper portion of the loop above the pipe, and releasing the legs so that the legs engage the strap loop while the bottom of the restrainer seats on the pipe securing the pipe in the loop against movement.

45. A method as set forth in claim 44, including the step of providing each leg with a notch to embrace the strap loop when the legs are released.

46. A method as set forth in claim 45, wherein the restrainer is substantially longer than the width of the strap loop and said notches are provided in the center of each leg.

47. A method as set forth in claim 44, including the step of suspending the loop from a threaded rod with a nut, and providing each leg with an inward angled projection to seat against the nut when the legs are released.

48. A method as set forth in claim 44, wherein said legs are angled away from each other when unbiased.

* * * * *